United States Patent [19]

Reedman et al.

[11] Patent Number: 5,094,538
[45] Date of Patent: Mar. 10, 1992

[54] DIGITIZING THE SURFACE OF AN IRREGULARLY SHAPED ARTICLE

[75] Inventors: David C. Reedman, Melton Mowbray; Peter M. Witty, Leicester; Stephen J. Marshall, Leicester; Hugh G. Sasse, Leicester, all of England

[73] Assignee: British United Shoe Machinery Limited, England

[21] Appl. No.: 598,003

[22] Filed: Oct. 10, 1990

[30] Foreign Application Priority Data

Oct. 13, 1989 [GB] United Kingdom ............... 8923169

[51] Int. Cl.$^5$ .................... G01B 11/24; H04N 13/00
[52] U.S. Cl. ................................ 356/376; 12/146 L;
364/561; 358/88
[58] Field of Search ............... 356/375, 376, 1, 4;
364/575, 561, 516; 42/146 L; 358/93, 107, 88,
101; 352/43, 58

[56] References Cited

U.S. PATENT DOCUMENTS

4,745,290 5/1988 Frankel et al. ............... 12/146 L
4,884,307 12/1989 Shafir ........................ 12/146 L
4,957,369 9/1990 Antonsson .................... 356/376

Primary Examiner—F. L. Evans
Assistant Examiner—K. P. Hantis
Attorney, Agent, or Firm—Owen J. Meegan; Avbrey C. Brine

[57] ABSTRACT

An optical system and method for digitizing a last or other irregularly shaped article comprises a laser device fixed on a base directing a light beam at a last supported for rotation about an axis, perpendicular to which the light beam is directed. Two cameras are fixed to the base, one at each side of the laser device, and each comprises an array of cells for detecting the point of incidence of the light beam on the last surface. As the last is rotated, the point of incidence varies in relation to a datum, e.g. the axis of rotation, and the point maximum intensity of illumination on the array of cells will vary across the array accordingly. By a correlating technique, the distance of the point of incidence from the datum can be determined according to the point of maximum intensity of the array. Thus, for digitizing the last, it is necessary merely to rotate it and also move it in a direction along its length for a large number of point positions to be detected, these being then stored as digitized coordinate axis value (R-theta-z). Because the last is an irregularly shaped object, in certain circumstances it is necessary to provide more digitized point positions than in other areas. These are all catered for either by flagging for a subsequent in-fill operation or by back-stepping over reduced angles of rotation of the last.

19 Claims, 6 Drawing Sheets

DIGITIZING THE SURFACE OF AN IRREGULARLY SHAPED ARTICLE

BACKGROUND OF THE INVENTION

This invention is concerned with digitizing the surface of an irregularly shaped article, e.g. a shoe last.

There is described in U.S. Pat. No. 4,817,222 one method of digitizing the surface of an irregularly shaped article, e.g. a shoe last, using an apparatus which comprising a support for supporting an article the surface of which is to be digitizing, a digitizing assembly comprises a light source by which a light beam can be directed along a path so as to strike the surface of such article, and means for detecting the point of incidence of the light beam with said surface, means for effecting relative rotational movement between the support and the digitizing assembly about an axis of rotation which passes lengthwise through an article supported by the support and in the direction of which the path of the light beam extends perpendicularly thereto, and also for effecting relative lengthwise movement therebetween in a direction along said axis, means for monitoring the relative rotational position of the support and digitizing assembly and also the relative lengthwise position thereof at regular intervals, means for supplying signals corresponding to each such monitored position and also for supplying a signal having a value corresponding to the distance of the point of incidence of the light beam from the axis of rotation at each such monitored position, whereby a succession of coordinate signals representing point positions, i.e. points of incidence in terms of relative rotational and lengthwise movements as well as distance, is derived, and means for converting such succession of signals to provide a set of data by which the surface of the article is defined.

In said apparatus the digitizing assembly is in the form of a so-called laser range sensor, utilising the principle of triangulation, which sensor is fixed in relation to the rotational movement of the shoe last but is movable linearly along an axis parallel to the axis of rotation of the last, and by which a beam of light is directed towards the shoe last and the point of incidence of said beam with the shoe last surface is detected. Using such an arrangement, whereas for the most part the surface of the last can be adequately digitized, problems do arise where, for example, the point of incidence of the light beam with the shoe last surface cannot be "seen" by the detector; this occurs where, for example, the portion of the last surface upon which the light falls is cut away or is generally hidden by a more bulbous portion of the shoe last, such as can arise where the light is incident upon the side portions of the crown of the last. Thus, depending upon the particular shape of the shoe last it is not always possible, using a fixed sensor arrangement, to monitor each and every point of incidence of the light with the last surface.

In order to avoid this problem of the sensor being "unsighted", it is proposed in WO-87/01194 to utilize an optical system including two mirrors by which each point of incidence of the light beam with the article surface to be digitized is looked at by both mirrors and the images thus received by the mirrors are superimposed upon one another and thus supplied to the sensor; in this way, if one of the mirrors is "unsighted", nevertheless the composite, i.e. overlapped, image is nevertheless complete. In this system, however, it is a question of using a line of light, rather than a point, and scanning the whole length of the line in one scanning operation. Moreover, the image from one of the mirrors must be reversed, using a further mirror which allows the image from the other mirror to pass therethrough and all three mirrors must be accurately maintained in alignment with one another and with the sensor in order to ensure that the two images are coincident, and furthermore each mirror must be so arranged that the angle subtended between the light beam directed from the light source towards the article surface and the light beam directed from the light source towards the article surface and the image directed towards the mirror is the same in the case of each of the two mirrors; otherwise the images from the two mirrors will not be coincident.

OBJECT OF THE INVENTION

It is one of the various objects of the present invention to provide an improved method of digitizing the surface of an irregularly shaped article, e.g. a shoe last, in carrying out which method each point of incidence of the light beam with the article can be "seen" utilizing a relatively simple construction of apparatus.

It is another of the various objects of the present invention to provide an improved apparatus for digitizing the surface of an irregular shaped article, e.g. a shoe last, wherein the points of incidence of the light beam with the article surface can always be "seen", but without the need for complicated setting up procedures for the optical arrangement and without the need for ensuring parity between the subtended angles referred to above.

SUMMARY OF THE INVENTION

The invention thus provides, in one of its several aspects, a method of digitizing the surface of an irregularly shaped article, e.g. a shoe last, comprising supporting the article the surface of which is to be digitized and directing a light beam from a source towards the article and monitoring the point of incidence of the light beam on the article surface, and effecting relative rotational movement between the article and the light source about an axis of rotation and also relative linear movement therebetween in a direction along said axis whereby a plurality of points of incidence of the light beam on the article surface are successively monitored covering the whole of the surface to be digitized, wherein for effecting such monitoring two cameras are used each comprising an array of cells, the cameras being mounted one at either side of the light beam source and in a fixed relationship therewith and only one being operational at any time, the arrangement being such that the same camera is used for a succession of such points until said camera fails to detect a point, whereupon the other camera is then rendered operational in its stead said other camera then continuing in use until it fails to detect a point, whereupon the first-mentioned camera is rendered operational, and so on. The method further comprising determining, according to which of the cells of the array of the operational camera is illuminated, the distance of the monitored point of incidence from a known datum (e.g. the axis of rotation) and thus the position of said point, and storing digitized coordinate axis values for the position of each such point to provide a data set by which to define the surface of the article.

For carrying out such a method, furthermore, the invention also comprises in another of its several aspects, an apparatus for digitizing the surface of an irregularly shaped article, e.g. a shoe last, comprising a support for supporting an article the surface of which is to be digitized, a digitizing assembly comprising a light source by which a light beam can be directed along a path so as to strike the surface of such article, and means for detecting the point of incidence of the light beam with said surface, means for effecting relative rotational movement between the support and the digitizing assembly about an axis of rotation which passes lengthwise through an article supported by the support and in the direction of which the path of the light beam extends perpendicularly thereto, and also for effecting relative lengthwise movement therebetween in a direction along said axis, means for monitoring the relative rotational position of the support and digitizing assembly and also the relative lengthwise position thereof at regular intervals means for supplying signals corresponding to each such monitored position and also for supplying a signal having a value corresponding to the distance of the point of incidence of the light beam from the axis of rotation at each such monitored position, whereby a succession of coordinate signals representing point positions, i.e. points of incidence in terms of relative rotational and lengthwise movements as well as distance, is derived, and means for converting such succession of signals to provide a set of data by which the surface of the article is defined, the detecting means of the digitizing assembly comprises at least two cameras, each comprising a line array of cells, said cameras being so positioned that at least one of them will be capable of monitoring each point position, such monitoring taking place, when the camera is operational, by one or more of its cells being illuminated by the light beam having struck the article surface, and in addition in response to such illumination of the cell(s) said signal corresponding to the distance of the point of incidence from the axis of rotation being caused to be supplied, and in that in the operation of the apparatus only one camera is operational at any one time, the arrangement being such that the operational camera remains operational until it fails to detect a point position, whereupon the other camera, or another of the cameras, as the case may be becomes operational and so on.

It will thus be appreciated that, in carrying out such method and in using such apparatus, simply by monitoring whether one of the cameras is "unsighted" and in response thereto switching to the other camera, in a simple but effective way each point of incidence of a light beam upon the surface of the shoe last can thus be detected and the surface thus readily be digitized.

In a preferred embodiment of the invention each camera is calibrated, independently of the other (or each of the others, as the case may be), by positioning a surface successively at a plurality of known distances from the axis of rotation and for each such position recording the corresponding illumination of the cells in the array of said camera, and, by interpolation for intermediate distances, providing a look-up table or graph of distance against cell illumination. In this way the angle at which each camera is spaced from the light source by the axis of rotation can be selected without reference to the other or any other of the cameras as the case may, and thus the criterion for determining the position of each camera is essentially what is convenient for ensuring that each point of incidence will be viewed by at least one of the cameras and not by the need for ensuring coincidence of the image received thereby.

In carrying out the method in accordance with the invention, desirably in effecting relative rotational movement and relative lengthwise movement as aforesaid, an increased number of point positions is stored in the data set for each region of the article surface detected as being of high curvature (as hereinafter defined) thus to ensure adequate definition of the article surface; the phrase "of high curvature" where used herein in relation to a region of an article surface is to be understood as indicating a region in which a corner or other relatively shaped curve is to be found. (Conveniently the requisite degree of curvature required to be designated a region of high curvature is set arbitrarily and is detected by calculating the angle subtended by a line drawn between three successive points.) More particularly during such relative movement regions of the article surface detected as being of high curvature (as hereinbefore defined) are initially flagged and thereafter an increased number of point positions is determined in each such region thus to ensure adequate definition of the article surface.

A similar situation arises, where, because of the angle of the particular article surface portion in relation to the light beam, the distance between that point of incidence and the preceding one exceeds a pre-set value (indicating a "long arc"). It will be appreciated that the information obtained in this digitizing operation may be subsequently used for the purpose of displaying a shoe last on a monitor screen, to which end an interpolation technique has to be used which is based upon connecting the point positions using curves or arcs; thus the situation could arise that an excessive distance between two points, which will often in fact indicate a relatively flat surface, can be drawn on the screen as a curved surface. In order to overcome this problem, in accordance with the invention preferably the region of such "long arc" is also flagged and thereafter a greater number of point positions is determined as aforesaid in said region. In this way adequate information is received in respect of such regions in order to ensure adequate definition of the article surface in such regions.

As already mentioned, in carrying out the method in accordance with the invention the determination of point positions preferably occurs initially at regular intervals during the rotation of the article. There is then a question as to when the greater number of point positions to be detected in respect of a region of high curvature or a region of a long arc are to be determined. It would of course be possible to effect the determination of such additional points together with the regularly spaced points, e.g. by reversing the direction of rotation of the article. Preferably, however, in carrying out the method in accordance with the invention the determination of point positions at regular intervals is first completed at least for one complete rotation of the article before said greater number of point positions is determined for a flagged region. If considered desirable, furthermore, the initial determination of point positions for the whole of the article at regular intervals as aforesaid may be completed before a greater number of point positions is determined for a flagged region. Thereafter each flagged region is addressed in turn to provide the additional point positions required. To this end, furthermore, conveniently the or each flagged region is defined in terms of the angle through which the article has been rotated from a start position, this angle being stored as a flag value to facilitate the subsequent determination of a greater number of point positions as aforesaid.

The method referred to above is especially, but not exclusively, useful where the article is a shoe last. Such an article, though irregularly shaped, has a generally "standard" shape, including a last bottom which is defined in relation to the remainder of the last by a sharp corner (except in the inside waist region), and by a relatively long tapered "crown" terminating in a flat surface, also defined by a sharp corner, extending along the top of the last. Thus, it will be appreciated, the periphery of the last bottom and also the periphery of the top of the crown constitute regions of high curvature while the long tapered crown portion of the last is likely to constitute a region of long arcs. Moreover, further regions of high curvature are likely to be found especially in the toe region of the last where the top surface thereof effectively runs parallel with the last bottom, being spaced from the last bottom by side wall portions between which and the top of the last in the toe region further corners or areas of high curvature are to be found.

In digitizing a shoe last it has been found desirable to treat the last bottom as a defined and separately identifiable part of the shoe last and consequently the light beam is preferably initially directed towards the bottom of the last at the start of a digitizing operation and, as an initial operation, by monitoring the point of incidence of the light beam with the last bottom surface a region of high curvature (as hereinbefore defined) is detected, whereupon the direction of rotation is reversed and the monitoring step is then repeated in the reverse direction for a number of more closely spaced point positions until said region of high curvature is again detected, thereby determining the location of the boundary point position, each boundary point position being thereafter similarly detected. It will thus be appreciated that, whereas with other regions of high curvature it is merely a question of flagging and subsequently determining a greater number of point positions in the region, the last bottom is treated as a special case and preferably the boundary point positions are digitized before any further digitizing of other point positions on the last surface is effected.

Where the relative linear movement between the support and the light source/camera assembly is effected step-by-step (as will be referred to hereinafter), the boundary point positions at opposite sides of the last may be detected alternately and indeed such boundary point positions may first be detected and thereafter the determination of other point positions for that step of movement may be effected before moving to the next step. Alternatively, it may be more desirable for all the boundary points of the last bottom to be digitized, thus defining the whole of the periphery of the last bottom, before any other points are digitized, and indeed it may be more convenient for the boundary point positions to be detected progressively along the periphery of the last bottom, e.g. starting from the toe and progressing along one side to the heel and thereafter back along the other side to the toe, all the boundary point positions thus being detected and corresponding coordinate axis values stored before the determination of other point positions is effected. Moreover, conveniently the coordinate axis values for the point positions relating to the last bottom are stored in one file and the remaining values in another file.

As already mentioned above, the relative movement between the support and the light source/camera assembly may be effected step-by-step (although in accordance with the invention in its broader aspects such relative movement may be continuous). In the "step-by-step" approach the digitizing will produce effectively slices of the last, whereas in the "continuous" approach a spiral will be created. Either digitizing approach can be accommodated in a computer controlling the display of the shoe last in accordance with such information. In a preferred embodiment of the invention the article (shoe last) is movable in a direction along said axis of rotation step-by-step and is rotated through 360° about said axis at each such step, thereby providing a set of coordinate axis values defining the periphery of a "slice" of the article (shoe last).

It will be appreciated that the light beam, and more particularly the light falling on the article surface, must be sufficient distinctly to illuminate one area of the array of cells of the camera at the appropriate position, and in particular must be distinguishable by the camera from ambient light and preferably should have a characteristic to which the array of cells is particularly sensitive. It has been found convenient therefore to provide a light source in the form of a laser device which emits a narrow beam the point of incidence of which with the article surface is readily detectable by the camera(s). It will of course be appreciated that, although reference is made herein to a "light source", other forms of energy beams may find use in carrying out the invention and the term "light source" where used herein is intended to cover other forms of energy radiation.

There now follows a detailed description, to be read with reference to the accompanying drawings, of one method and one apparatus in accordance with the invention. It will of course be appreciated that this method and this apparatus have been selected for description merely by way of exemplification of the invention and not by way of limitation thereof.

DESCRIPTION OF THE PREFERRED EMBODIMENT

Figure 1:
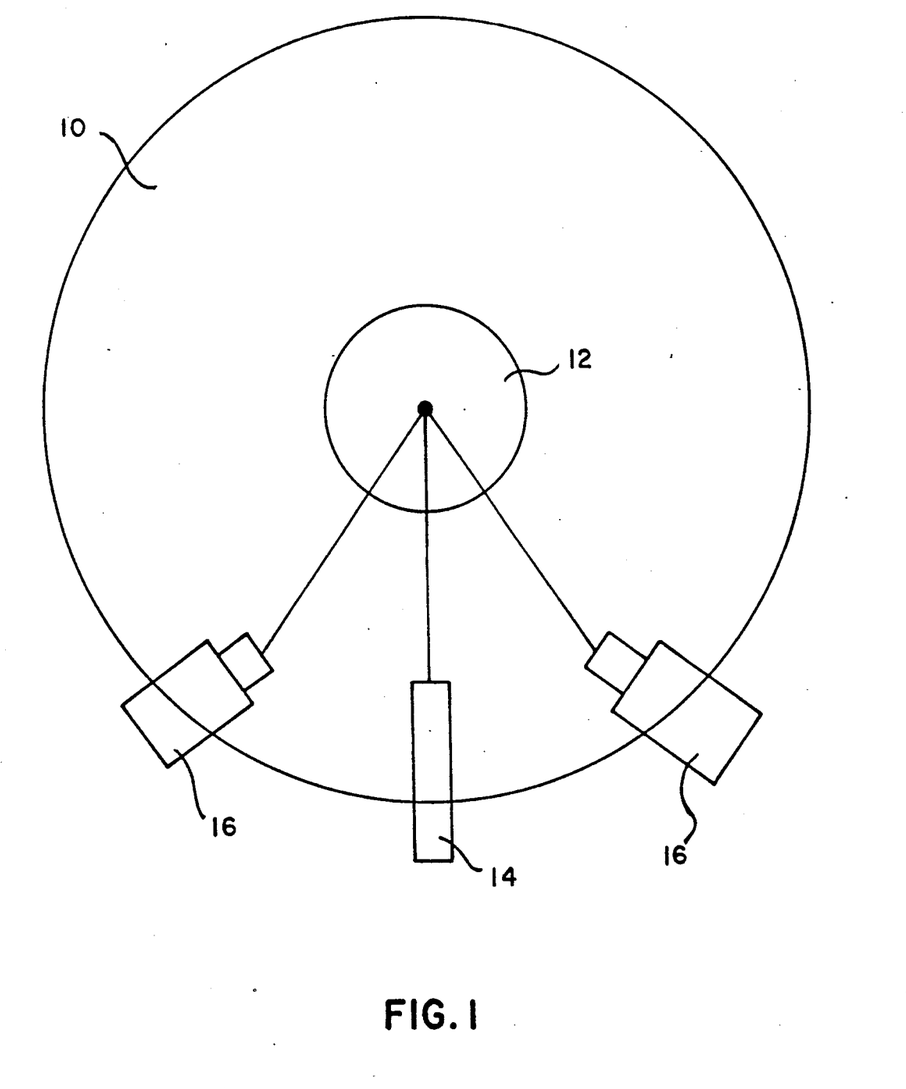
FIG. 1 is a schematic plan view of the apparatus in accordance with the invention.

The apparatus in accordance with the invention is especially, but not exclusively, for digitizing a shoe last for subsequent display upon a monitor screen. The apparatus thus comprises a base 10 on which is mounted a rotary support 12 for a shoe last, said support comprising a pin (not shown) which can be accommodated within an aperture formed in the backseam region of a shoe last to be digitized placed thereupon. The pin is mounted on a plate (not shown) which is capable of tilting and is lockable in a desired tilted position, the degree of tilt being sufficient to ensure that the toe of the last lies on the axis of rotation of the support. To this end a gauging pin (also not shown) is provided which is slidable heightwise manually by the operator and which lies on the axis of rotation, the arrangement being such that the toe of the last supported by the support 12 is aligned with the pin and the plate is then locked in tilted position.

Also supported on the base is a laser device 14 constituting a light source by which a light beam can be directed along a path extending perpendicularly to the axis of rotation of the support 12. In addition, two cameras 16 are fixedly mounted on the base, one at either side of the laser device 14, and are directed generally towards the axis of rotation.

Figure 2:
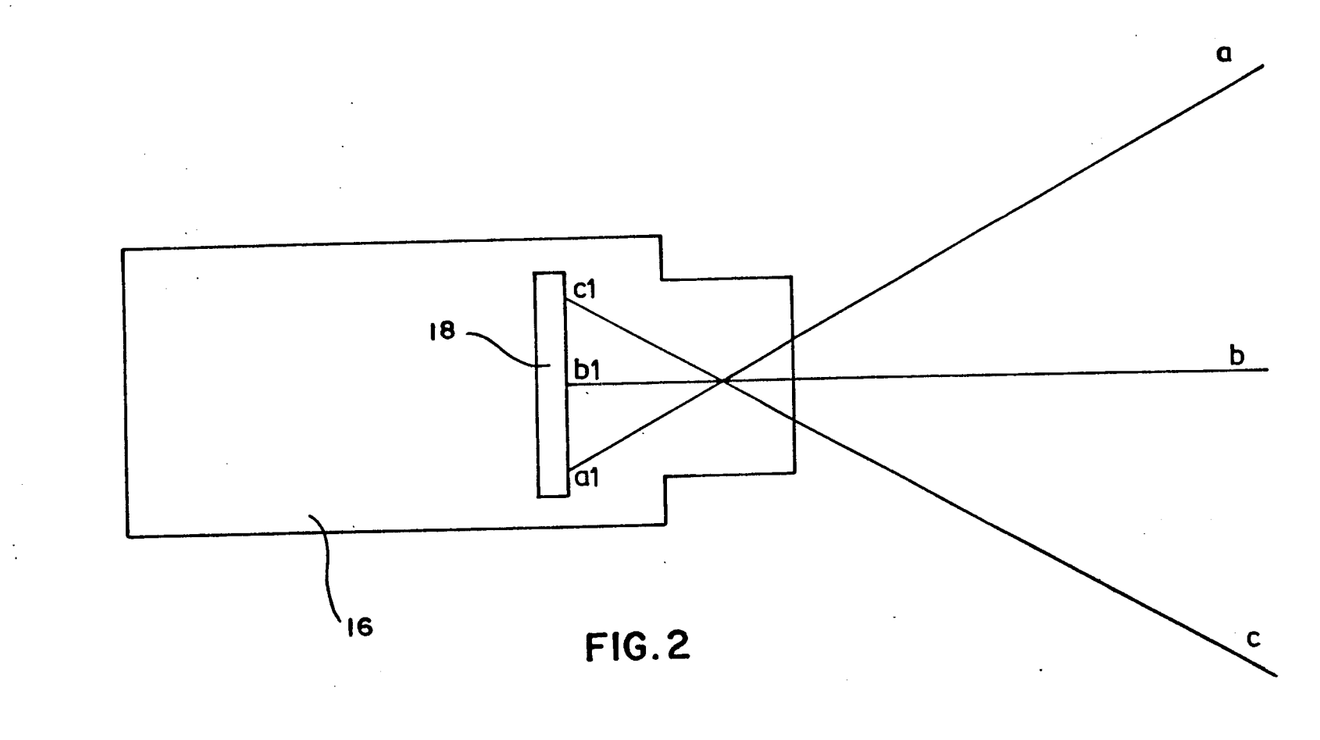
FIG. 2 is a schematic view indicating the manner in which a camera of the apparatus shown in FIG. 1 operates to detect the point of incidence of a light beam with an article surface.
Figure 3A:
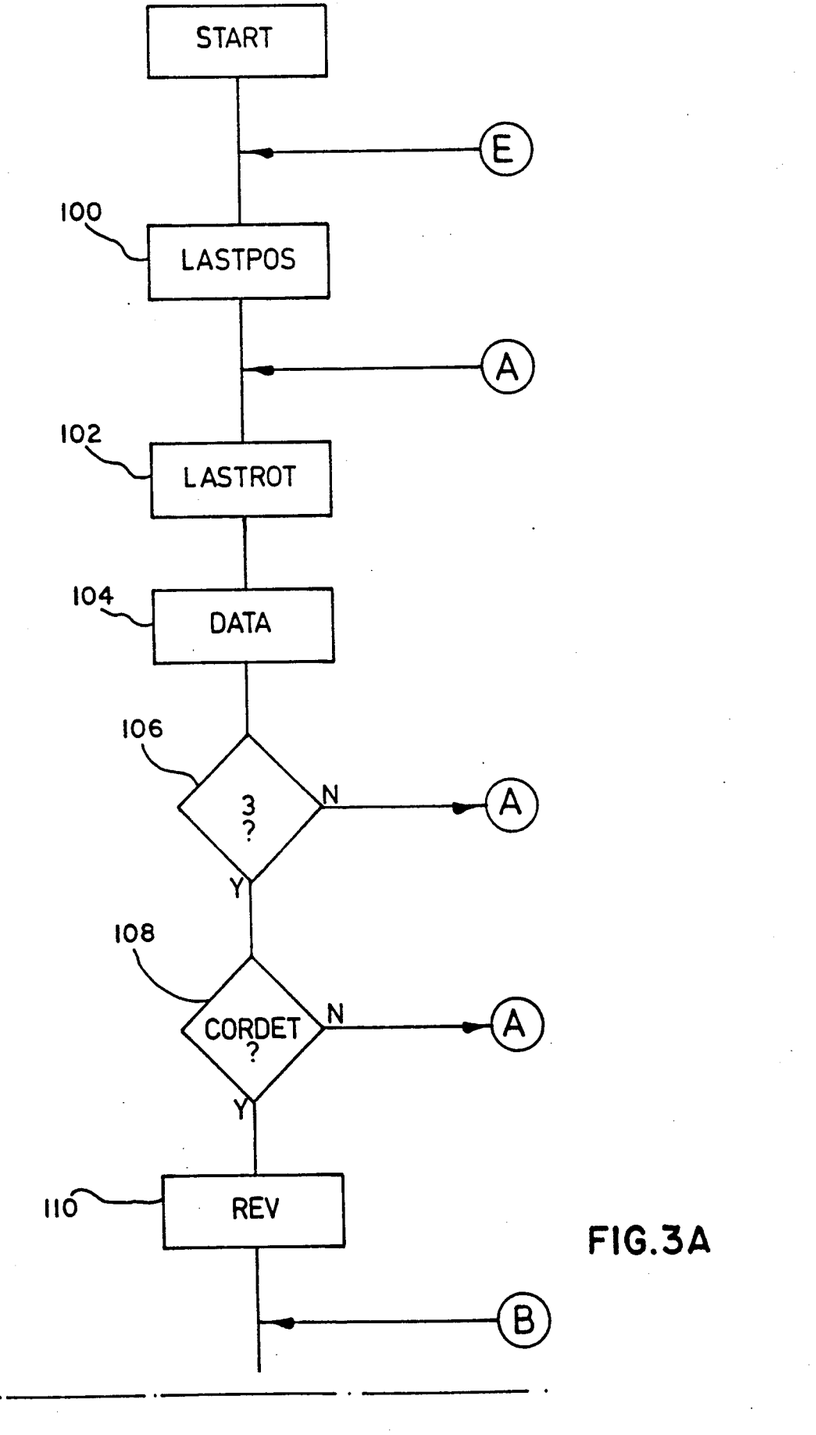
FIGS. 3A to 3D together form a flow chart indicating the mode of operation of the apparatus.
Figure 3B:
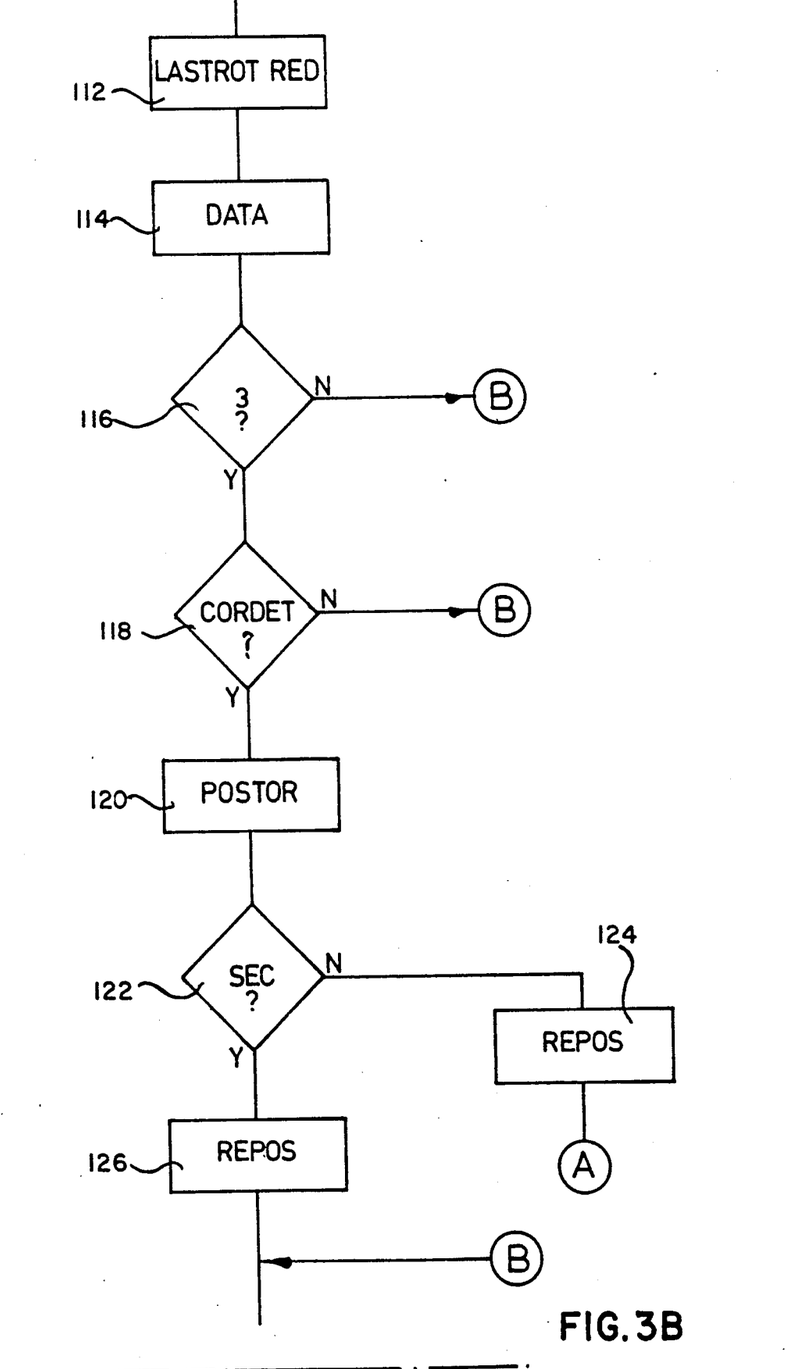
Figure 3C:
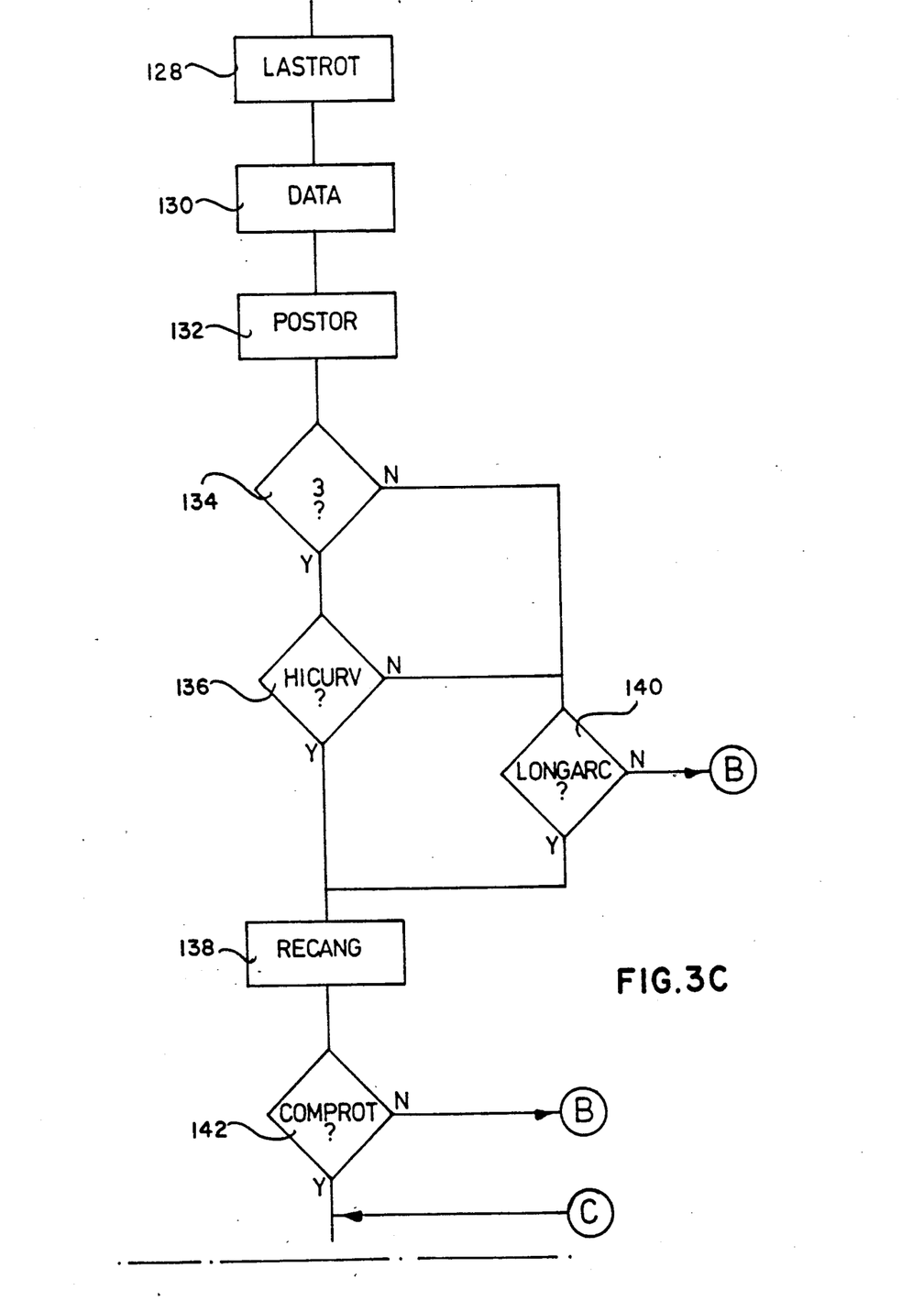
Figure 3D:
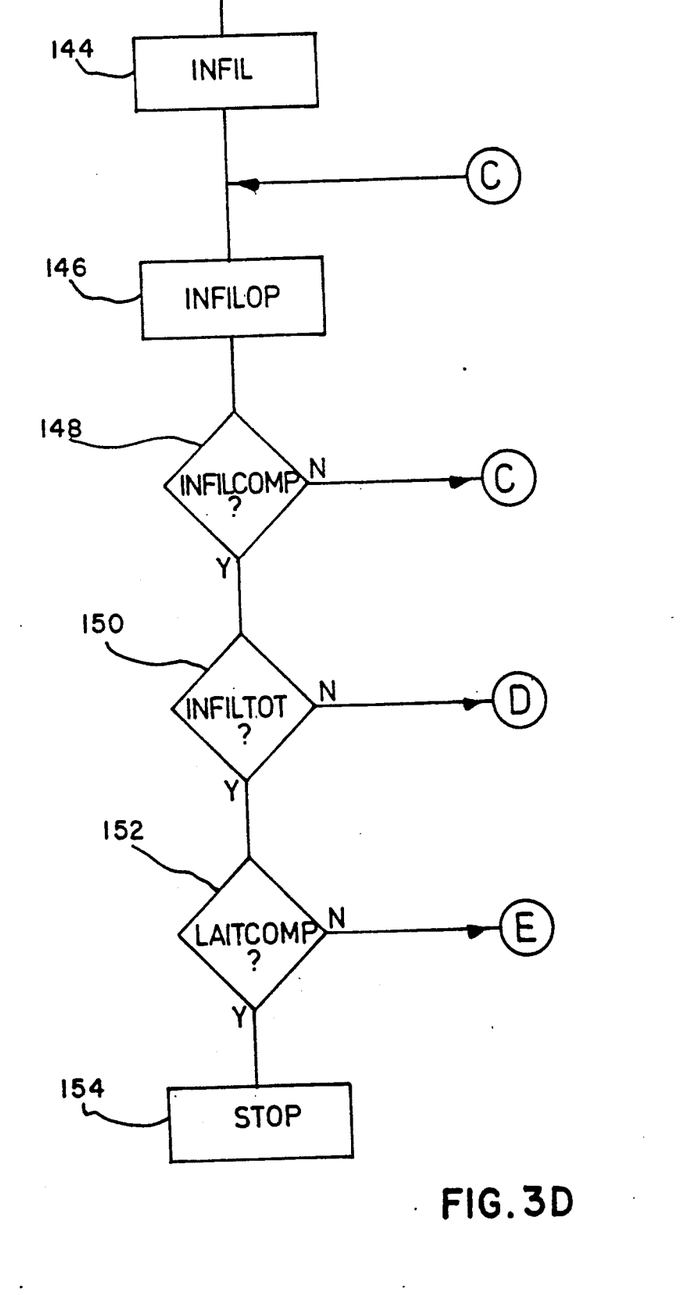

Each camera is of the so-called line-scan camera type and comprises a line array of cells 18 (in the present case 2048 pixels) onto which light is projected through a lens (not shown). The array is scanned regularly and frequently and the maximum intensity of illumination is detected. Thus, depending upon the point of incidence of the light beam on the surface of the last supported by the support 12 the point of maximum intensity will move across the array, so that there is a correlation between the point of incidence and the point of maximum intensity as detected. Thus the cameras 16 and the light source 14 can be fixed on the base 10. Whereas, as discussed above, it is unnecessary for the angles subtended by the cameras with the light beam from the light source to be equal, it is however desirable that the cameras are at the same height as each other and preferable that they are also at the same height as the light source, thereby eliminating any distortions which could affect the readings obtained.

For rotating the support 12 a suitable stepping motor (not shown but referred to as SM1) is provided, together with a monitoring system for determining the degree of rotation about the axis. Similarly, the support 12 is mounted for heightwise movement relative to the laser device 14 and cameras 16, such movement in the embodiment now being described being step-by-step and being effected by a second stepping motor (also not shown, but referred to as SM2), together with means for monitoring the operation of the stepping motor SM2 and thus the distance moved heightwise by the shoe last supported by the support 12.

From the foregoing it will be apparent that signals are provided by the array 18 (R), the monitoring means for stepping motor SM1 (theta) and the monitoring means for stepping motor SM2 (Z), said three signals relating to the three-dimensional position of the point of incidence of the light beam with the shoe last at any given time, and the signals thus readily being convertible to digitized coordinate axis values for such point of incidence.

In order to achieve a correlation between the point of maximum intensity of illumination of the array 18 and the distance of the point of incidence of the light beam with the article surface from the datum point, it is necessary to calibrate each camera 16. By calibrating each camera independently, furthermore, it is ensured that the signals received from each array will be interpreted in the same manner. For calibrating each camera, therefore, a calibration plate or block is placed on the support 12, the surface of which, against which the light beam is directed, is a known distance from the axis of rotation, e.g. 25 mm. The point of maximum intensity on the array of the camera being calibrated is then noted and the calibration step is then repeated with a plate or block at certain other distances, typically 50 mm, 75 mm and 100 mm from the datum, and each value for a point of maximum intensity of illumination is again recorded. From these four points intermediate values are interpolated and a look-up table or graph created. A similar calibration is effected for each camera. It will thus be appreciated that it is not important that the cameras are aligned at equal angles from the path of the light beam and indeed the reading from the two arrays can be different, but the interpretation of the values in terms of distance from the datum will nevertheless be the same.

Referring now to FIGS. 3A to 3D a typical last digitizing operation using the above-described apparatus will be described, such operation constituting the method in accordance with the present invention. In practice the digitizing operation begins at the toe end of the shoe last which is positioned heightwise by the operation of stepping motor SM2 and further is positioned at the axis of rotation of the support 12 by the gauging pin (step 100). The support is then rotated by motor SM1 step-by-step through a pre-determined angle (in the present case 7°) (step 102) and at each such position the R-theta-Z data is read (step 104). In order to detect a corner or region of high curvature (as hereinbefore defined) three points are necessary and thus at step 106 the question is asked whether data for three points has been read. If "no", then steps 102 onwards are repeated. If (and when) the answer is "yes", then at step 108 the question is asked whether a corner or region of high curvature has been detected. As already mentioned above, in order to detect such a region or corner the angle subtended by a line joining the last three successive points is examined and if the angle exceeds a pre-determined threshold then a corner is designated. If the answer is "no", then steps 102 onwards are repeated. If the answer is "yes", then the direction of rotation of the support 12 is reversed (step 110) and the rotation of the support is then stepped at smaller angles, typically 1½° (step 112), the R-theta-Z values for each point position being again read as at step 104 and the routine involving steps 106, 108 is repeated at steps 116 and 118, a "no" answer to either of these latter questions causing a loop back to step 112. When a "yes" answer is received at step 118 the coordinate axis values for the corner or boundary point position are stored. At step 122 the question is asked whether this is the second boundary point position recorded for the particular heightwise position of the support. If the answer is "no" then firstly the support is rotated, still in its reverse direction, back to its initial position (step 124) and thereafter, still in reverse direction, the sequence of steps beginning at step 102 is repeated, in said reverse direction, for the opposite boundary point position. It will of course be appreciated that in this case the reversing of direction at step 110 means that the last support will then be rotating in the same direction as that in which it initially moved.

In the event that the answer at step 122 is "yes" then again the support is returned, this time in its initial direction of rotation, and at step 128 the support 12 is rotated in said original direction in steps of 7° and the data for each position is read (step 130) and stored (step 132).

Where a region of high curvature is met on the last surface it is necessary, in order to obtain adequate definition of the curvature in that region, to take more point positions than generally over the last surface. Thus, as in the case of the corners of the last bottom, at step 134 the question is asked whether three points have already been stored. If the answer is "yes", then at step 136 the curvature of the region being digitized is questioned, generally in the same manner as the corners of the last bottom, but in this case, since a lesser degree of curvature is envisaged, the threshold is less than in the case of the corner. If the answer at step 136 is "yes" then the angle through which the support has rotated to the position is recorded as a flag for a subsequent in-filling operation, to be described hereinafter, in which a greater number of intermediate point positions are digitized and stored.

Because of the irregularity of the shape of the last it may be that the angle at which the light beam strikes the last surface is relatively narrow so that an excessive distance arises between successive point positions. As already discussed above, in such circumstances the interpolation technique used will not give a true definition to the last surface in that region (referred to herein as a "long arc" region). If therefore the answer to either one of steps 134, 136 is "no", then at step 140 the question as to whether a long arc region arises is posed. If the answer to that question is also "no", then the system loops back to step 128. In the event of a "yes" answer, on the other hand, the system loops to step 138 at which the angle through which the support 12 has rotated to arrive at the position digitized is again recorded as a flag for subsequent in-filling.

At step 142 the question is asked whether the support 12 has rotated through 360°. If "no", then the system again loops to step 128. In the event of a "yes" answer, on the other hand, the program moves to the in-filling procedure, now to be described.

At step 144 the instruction "move to the next in-fill position" is given; this is of course for the particular "slice" of the last being treated. This instruction involves the nearest flag to the present position of the support 12 being selected and the support 12 being rotated accordingly. At step 148 the in-fill operation is then effected, this operation being generally similar to that effected in the determination of boundary point positions (steps 122 et seq) except that the direction of rotation is not reversed and the in-filling operating is terminated upon the flagged point position being reached. After each storing of digitized data the question at step 148 is addressed, namely whether the flagged position has been reached (and thus the in-fill operation has been completed). If the answer is "no" then the system loops back to step 146. If the answer is "yes" then the question is asked at step 150 whether the whole of the in-filling operations for the particular "slice" has been completed. If not, then the system loops back to step 144 and the next in-fill position as flagged is found. If the answer is "yes" then at step 152 the question is addressed as to whether the whole digitizing operation for the shoe last has been completed. In the event that a "no" answer is given, then the system loops back to step 100. If the answer is "yes" then the digitizing operation is completed and the system stops (step 154).

It will be appreciated that various other ways of programming the last digitizing operation may be utilized without going outside the scope of this invention. In particular, while retaining the general method of determination of boundary point positions, it may be desirable, instead of determining each pair of positions as a portion of each particular "slice" being digitized, to digitize all the boundary point positions first, or indeed all the last bottom points terminating at opposite boundary point positions first. Moreover, instead of digitizing the boundary points at opposite sides of the last bottom alternately, it may be preferable to determine all the boundary point positions along one side of the last first and then along the opposite side. Again, the boundary point position determination could be effected in the same manner as the detection of regions of high curvature, namely by flagging the boundary point positions and effecting an in-fill operation subsequently.

With regard to the movement of the last, furthermore, in the embodiment described above it is rotated step-by-step, but alternatively but nevertheless in accordance with the invention it can be rotated continuously. Similarly instead of the heightwise movement of the support 12 being effected step-by-step, that too could be effected continuously for the general digitizing operation (but not of course for the in-fill operations, and certainly not for boundary point position determination as described above; if the movement were continuous, then boundary point position determination would have to be by way of an in-fill operation as proposed above).

When the digitizing of the last is complete, a set of digitized coordinate axis values (R-theta-Z) are in the computer memory. At this stage desirably this information is transferred to a non-volatile memory e.g. a hard disc. If desired, at this stage the last bottom data is transferred to a "last bottom data file" while the remainder is stored in a "last upper data file".

It has been found that, using a laser device as a light source, nevertheless spurious reflected light is undesirable and further preferably the colour of the whole of the last should be constant. Consequently, preferably in carrying out a method in accordance with the invention the last used is preferably painted a single colour, e.g. white, but with a matt finish.

APPENDIX

100—LASTPOS—Move last to next position.
102—LASTROT—Rotate support step-by-step through 7° intervals.
104—DATA—Read R-theta-Z values for point position.
106—3?—Has data for three successive points been read?
108—CORDET?—Has corner been detected?
110—REV—reverse direction of rotation of support 12.
112—LASTROTRED—reduce step size of rotation of support to 1½°.
114—DATA—Read R-theta-Z values for point position.
116—3?—Has data for three successive points been read.
118—CORDET?—Has corner been detected?
120—POSTOR—Store coordinate axis values for boundary point position.
122—SEC?—Is this the second boundary point position stored for this heightwise support position?
124—REPOS—return support 12 to its initial position.
126—REPOS—return support 12 to its initial position.
128—LASTROT—Rotate support step-by-step through 7° invervals.
130—DATA—Read R-theta-Z values for point position.
132—POSTOR—Store coordinate axis values for boundary point position.
134—3?—Has data for three successive points been read?
136—HICURV—Has region of high curvature been detected?

138—RECANG—Record angle through which the support 12 has been rotated (flag for subsequent in-fill)
140—LONGARC?—Is the distance between the present and immediately preceding point longer than the pre-determined acceptable distance?
142—COMPROT?—Has support 12 been rotated through 360°?
144—INFIL—Move to next in-fill position as flagged.
146—INFILOP—Carry out in-fill operation; rotate last at reduced step size from point position immediately preceding flagged position until flagged position is reached.
148—INFILCOMP?—Has the flagged position been reached?
150—INFILTOT?—Have all the in-fill operations for the "slice" been completed?
152—LASTCOMP?—Has the whole of the last been digitized?
154—STOP—Terminate digitizing operation.

We claim:

1. Method of digitizing the surface of an irregularly shaped article, comprising providing an article having an axis of rotation with a light source spaced outwardly in respect to said axis and
supporting the article the surface of which is to be digitized and directing a light beam from the light source towards the article and monitoring the point of incidence of the light beam on the article surface, and
effecting relative rotational movement between the article and the light source about the axis of rotation and also relative linear movement therebetween in a direction along said axis whereby a plurality of points of incidence of the light beam on the article surface are successively monitored covering the whole of the surface to be digitized,
wherein for effecting such monitoring first and second cameras are used each comprising an array of cells, the cameras being mounted one at either side of the light beam source and in a fixed relationship therewith and only one being operational at any time, the arrangement being such that the first camera is used for a succession of such points until said camera fails to detect a point, whereupon the second camera is then rendered operational in its stead said second camera then continuing in use until it fails to detect a point, whereupon the first camera is rendered operational, and so on,
the method further comprising determining, according to which of the cells of the array of the operational camera is illuminated, the distance of the monitored point of incidence from a known datum and thus the position of said point, and
storing digitized coordinate axis values for the position of each such point to provide a data set by which to define the surface of the article.

2. Method according to claim 1 wherein each camera is calibrated by positioning a surface successively at a plurality of known distances from the datum and for each such position recording the corresponding illumination of the cells in the array of said camera, and, by interpolation for intermediate distances, providing a look-up table or graph of distance against cell illumination.

3. Method according to claim 2 wherein the cameras are calibrated independently of one another.

4. Method according to claim 1 wherein, in effecting said relative rotational movement and said relative linear movement, a predetermined degree of angularity in the curvature of the article surface is established as being of high curvature and in response to such a degree or greater degree of angularity being detected storing an increase number of point positions thus to ensure adequate definition of the article surface.

5. Method according to claim 4 wherein regions of the article detected as being of high curvature are initially flagged and thereafter a greater number of point positions to be monitored is determined in each such region thus to ensure adequate definition of the article surface.

6. Method according to claim 5 wherein the distance between successive points of incidence on the article surface is calculated and compared with a pre-set value and where said calculated distance exceeds said pre-set value the region of such distance exceeding said pre-set value is also flagged and thereafter a greater number of points positions to be monitored is determined in said region.

7. Method of digitizing an irregularly shaped article for subsequent display on a monitor screen, comprising the steps of
(i) mounting the article for rotation about an axis,
(ii) directing a light beam from a light source at said article along a path extending perpendicularly to said axis of rotation,
(iii) detecting the point of incidence of the light beam on the article surface,
(iv) determining from the detected point of incidence the distance of said point from a known datum and thus the position of said point,
(v) storing digitized coordinate axis values for the position of said point, and
(vi) rotating the article about its axis of rotation and progressively effecting relative movement between the article and the light source in a direction along said axis and repeatedly carrying out steps (iii), (iv) and (v) thus to provide a set of stored (digitised) digitized coordinate axis values sufficient to define the surface of the article,
wherein the distance between successive points of incidence on the article surface is calculated and compared with a pre-set value, and where said calculated distance exceeds said pre-set value the region of such distance exceeding said pre-set value is flagged and thereafter a greater number of point positions to be monitored is determined in said region.

8. Method according to claim 4 wherein the determination of point positions occurs initially at regular intervals during said rotational movement and such determination is completed at least for one complete rotation of the article before a greater number of point positions is determined for a flagged region.

9. Method according to claim 4 wherein the initial determination of a plurality of points of incidence of the light beam on the article surface which are to be successively monitored at regular intervals is completed before a greater number of point positions is determined for a flagged region.

10. Method according to claim 1 wherein the article is a shoe last and a degree of angularity in the curvature of the last surface is established as a region of high curvature and the light beam is initially directed towards the bottom of the last and, as an initial operation, and by monitoring the point of incidence of the light beam with the last bottom surface a region of high curvature is detected, whereupon the direction of rotation is reversed and the monitoring step is then repeated in the reverse direction for a number of more closely spaced point positions until said region of high curvature is again detected, thereby determining the location of a boundary point position, each boundary point position being similarly detected.

11. Method of digitizing the surface of a shoe last comprising the steps of
   (i) mounting the shoe last for rotation about an axis,
   (ii) directing a light beam from a light source at said shoe last along a path extending perpendicularly to said axis of rotation,
   (iii) detecting the point of incidence of the light beam on the shoe last surface,
   (iv) determining from the detected point of incidence the distance of said point from a known datum and thus the position of said point,
   (v) storing digitized coordinate axis values for the position of said point,
   (vi) rotating the shoe last about its axis of rotation and progressively effecting relative movement between the shoe last and the light source in a direction along said axis and repeatedly carrying out steps (iii), (iv) and (v) thus to provide a set of stored digitized coordinate axis values sufficient to define the surface of the shoe last, and
   establishing a predetermined degree of angularity in the curvature of the last surface, the angularity or greater degree of angularity being designated as a region of high curvature
   wherein the light beam is initially directed towards the bottom of the last and, as an initial operation, by monitoring the points of incidence of the light beam with the bottom surface a region of high curvature is detected, whereupon the direction of rotation is reversed and the monitoring step is then repeated, in the reverse direction for a number of more closely spaced point positions until said region of high curvature is again detected, thereby determining the location of a boundary point position, each boundary point position being thereafter similarly detected.

12. Method according to claim 11 wherein said boundary point positions at opposite sides of the last bottom are alternately detected.

13. Method according to claim 11 wherein the boundary point positions are detected progressively along the periphery of the last bottom.

14. Method according to claim 11 wherein all the boundary point positions are detected and corresponding coordinate axis values stored before the determination of other point positions is effected.

15. Method according to claim 11 wherein the coordinate axis values for the point positions relating to the last bottom are stored in one file and the remaining values in another file.

16. Method according to claim 1 wherein the article is movable in a direction along said axis of rotation step-by-step and is rotated through 360° about said axis at each such step, thereby providing a set of coordinate axis values defining the periphery of a cross-section of the article.

17. Method according to claim 1 wherein the light source is a laser.

18. Apparatus for digitizing the surface of an irregularly shaped article, comprising
   a support for supporting an article the surface of which is to be digitized,
   a digitizing assembly comprising a light source by which a light beam can be directed along a path so as to strike the surface of such article, and means for detecting the point of incidence of the light beam with said surface,
   means for effecting relative rotational movement between the support and the digitizing assembly about an axis of rotation which passes lengthwise through an article supported by the support and in the direction of which the path of the light beam extends perpendicularly thereto, and also for effecting relative lengthwise movement therebetween in a direction along said axis,
   means for monitoring the relative rotational position of the support and digitizing assembly and also the relative lengthwise position thereof at regular intervals,
   means for supplying signals corresponding to each such monitored position and also for supplying a signal having a value corresponding to the distance of the point of incidence of the light beam from the axis of rotation at each such monitored position, whereby a succession of coordinate signals representing point positions, is derived, and
   means for converting such succession of signals to provide a set of data by which the surface of the article is defined, the detecting means of the digitizing assembly comprising at least two cameras, each comprising a line array of cells, said cameras being so positioned that at least one of them will be capable of monitoring each point position, such monitoring taking place, when a camera is operational, by one or more of its cells being illuminated by the light beam having been struck the article surface, and in addition in response to such illumination of the cell(s) said signal corresponding to the distance of the point of incidence from the axis of rotation being caused to be supplied, and in that in the operation of the apparatus only one camera is operational at any one time, the arrangement being such that the operational camera remains operational until it fails to detect a point position, whereupon one other of said cameras becomes operational and so on.

19. Apparatus according to claim 18 each camera is calibrated, independently of the other or each of the others, as the case may be, by positioning a surface successively at a plurality of known distances from the axis of rotation and for each such position recording the corresponding illumination of the cells in the array of said camera, and, by interpolation for intermediate distances, providing a look-up table or graph of distance against cell illumination.

* * * * *